Sept. 25, 1923.

C. W. WEISS 1,469,059

TRANSMISSION DEVICE

Filed Sept. 13, 1922

INVENTOR
Carl W. Weiss
BY
ATTORNEYS

Patented Sept. 25, 1923.

1,469,059

UNITED STATES PATENT OFFICE.

CARL W. WEISS, OF NEW YORK, N. Y.

TRANSMISSION DEVICE.

Application filed September 13, 1922. Serial No. 587,896.

*To all whom it may concern:*

Be it known that I, CARL W. WEISS, a citizen of the United States, and a resident of the borough of Brooklyn, in the city of New York and State of New York, have invented certain new and useful Improvements in Transmission Devices, of which the following is a specification, reference being had to the accompanying drawing, forming a part hereof.

In another application of the present applicant for Letters Patent of the United States Serial No. 564,700, filed May 31, 1922, there is shown and described and covered broadly a transmission device of novel construction together with a torque governor by which variation of the speed ratio is effected automatically through variation of the torque or resistance of the driven element. In the present application there is shown and described a transmission device of the same general character as that shown in said application, but differing therefrom in some features of construction, together with a different embodiment of the torque governor.

The invention will be more fully explained hereinafter with reference to the accompanying drawing in which it is illustrated and in which—

Figures 1, 2:
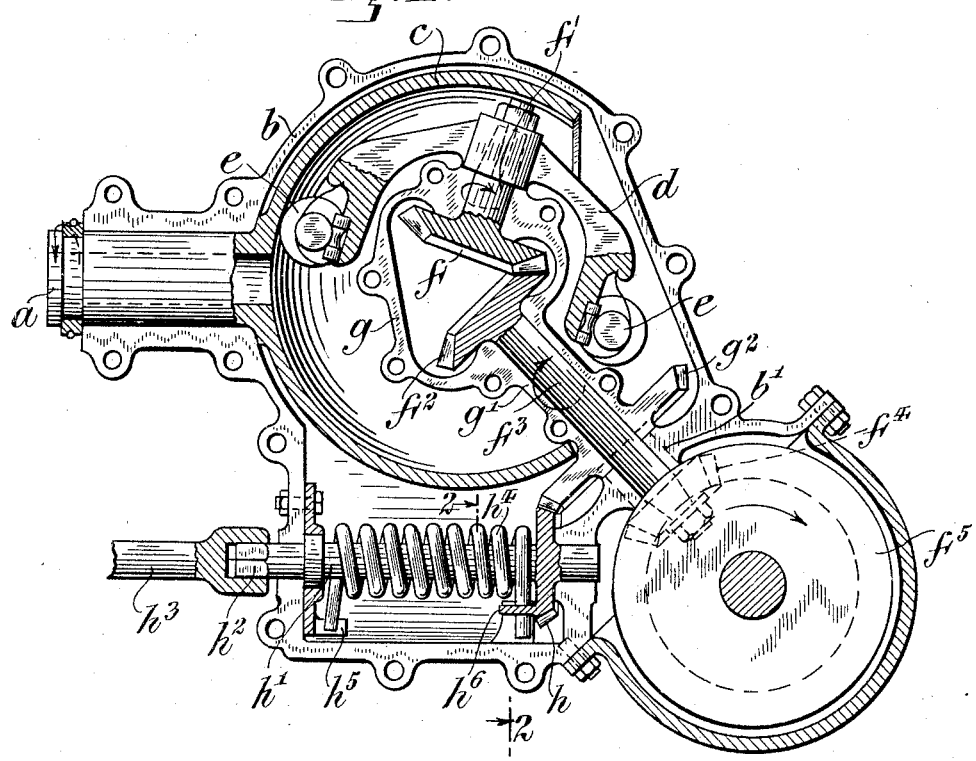
Figure 1 is a view of the transmission device and torque governor in sectional elevation.
Figure 2 is a detail view in section on the plane indicated by the broken line 2—2 of Figure 1.

In the embodiment of the invention illustrated in the drawing, the driving part or shaft $a$ is shown as mounted for rotation in a fixed housing $b$, which supports the several working parts of the mechanism to be described. The shaft $a$ has secured thereto or formed therewith the internally spherical driving member $c$, which is shown as somewhat more than hemispherical. The mutor $d$ which co-operates with the driving member $c$ substantially as set forth in the application above mentioned, is armed with gripping members $e$ which are supported substantially as described in said application so as to insure proper driving contact with the internally spherical member $c$. The mutor is supported as hereinafter described, so that its angular position with respect to the driving member can be varied, and is secured to the spindle $f'$ of a gear $f$ in mesh with a gear $f^2$ on a shaft $f^3$ which at its other end, in the construction shown, carries a gear $f^4$ in mesh with the gear $f^5$ to be driven. The spindle $f'$ and the shaft $f^3$ are mounted in suitable bearings supported by a frame $g$ which in turn is mounted so as to be capable of rotation in a bearing $b'$ provided in the housing $b$. The tubular portion $g'$ of the frame $g$ has a gear $g^2$ which engages a gear $h$ on a shaft $h'$ mounted in the housing or support and adapted for engagement, as at $h^2$, by a means, such as the shaft $h^3$, by which the shaft $h'$ can be rotated manually or at the will of the operator. A spring $h^4$ bears at one end against a fixed stop $h^5$ and at the other end against a stop $h^6$ on the gear $h$.

The spring $h^4$ constitutes a means tending normally to move the mutor to the position of maximum speed, with the plane of contact of the gripping elements $e$ at nearly right angles to the axis of the shaft $a$. This action is brought about through the rotation of the shaft $h'$ and gear $h$ and the rotation of the frame $g$ to such position that the mutor $d$ will occupy the position just described. Through the application of any suitable force to the shaft $h'$ through the connection $h^3$ the operator can change the relative angular position of the mutor as desired, either with or against the resilient means represented by the spring $h^4$. If, in the operation of the mechanism, the resistance or torque reactance of the driven part $f^5$ is increased, the gear $f$ will tend to roll about the periphery of the gear $f^2$, carrying the frame $g$ in a direction which tends to place the mutor $d$ in its zero position, with the plane of the gripping elements $e$ including the axis of the shaft $a$. This movement of the frame by the torque reactance takes place against the yielding resistance offered by the spring $h^4$ and will cease when equilibrium between these opposing forces is established. When the resistance or torque reactance again diminishes the spring $h^4$ will move the frame $g$ toward the position of maximum speed to an extent determined by the relation between the resistance and the force of the spring $h^4$. In this manner the transmitted speed is reduced and the torque effort is increased in proportion to the increase of resistance or torque reactance.

The relative angular disposition of the axis of the mutor supporting frame $g$ and the shaft $a$ is preferably about as shown.

The gears $f$ and $f^2$, as will be evident, constitute a convenient form of joint in which one member revolves about the axis of the other.

It will be understood that various changes in details of construction and arrangement can be made to suit different conditions of use and that, except as pointed out in the claims, the invention is not limited to the precise construction shown and described herein.

I claim as my invention:

1. A power transmission device comprising a driving element, a driven element, one of said elements being capable of being changed in position with respect to the other element to vary the speed ratio of the two elements, a gear carried with the element capable of being changed in position, a second gear in mesh with the first and operatively connected with the part to be driven, a rotatable frame supporting the element capable of being changed in position and the first mentioned gear and permitting the first mentioned gear to roll upon the periphery of the second mentioned gear in response to variations in torque reactance, and means to oppose such rotation of the supporting frame.

2. A power transmission device comprising a driving element, a driven element, one of said elements being capable of being changed in position with respect to the other element to vary the speed ratio of the two elements, a gear carried with the element capable of being changed in position, a second gear in mesh with the first and operatively connected with the part to be driven, a rotatable frame supporting the element capable of being changed in position and the first mentioned gear and permitting the first mentioned gear to roll upon the periphery of the second mentioned gear in response to variations in torque reactance, and resilient, yielding means to oppose such rotation of the supporting frame.

3. A power transmission device comprising a driving element, a driven element, one of said elements being capable of being changed in position with respect to the other element to vary the speed ratio of the two elements, a gear carried with the element capable of being changed in position, a second gear in mesh with the first and operatively connected with the part to be driven, a rotatable frame supporting the element capable of being changed in position and the first mentioned gear and permitting the first mentioned gear to roll upon the periphery of the second mentioned gear in response to variations in torque reactance, and manually controlled means to vary the position of the supporting frame.

4. A power transmission device comprising a driving element, a driven element, one of said elements being capable of being changed in position with respect to the other element to vary the speed ratio of the two elements, a gear carried with the element capable of being changed in position, a second gear in mesh with the first and operatively connected with the part to be driven, a rotatable frame supporting the element capable of being changed in position and the first mentioned gear and permitting the first mentioned gear to roll upon the periphery of the second mentioned gear in response to variations in torque reactance, a shaft geared to said frame and a spring applied to said shaft to rotate the same in opposition to the torque reactance.

5. A power transmission device comprising a spherical driving element, a mutor having gripping elements for co-operation with the spherical driving element and capable of being changed in relative angular position with respect to the driving element, a gear carried with the mutor, a second gear in mesh with the first and operatively connected with the part to be driven, a rotatable frame supporting the second gear and the motor and permitting the first gear to roll upon the periphery of the second gear in response to variations in torque reactance, and means to oppose such rotation of the supporting frame.

6. A power transmission device comprising a spherical driving element, a mutor having gripping elements for co-operation with the spherical driving element and capable of being changed in relative angular position with respect to the driving element, a gear carried with the mutor, a second gear in mesh with the first and operatively connected with the part to be driven, a rotatable frame supporting the second gear and the mutor and permitting the first gear to roll upon the periphery of the second gear in response to variations in torque reactance, and resilient, yielding means to oppose such rotation of the supporting frame.

7. A power transmission device comprising a spherical driving element, a mutor having gripping elements for co-operation with the spherical driving element and capable of being changed in relative angular position with respect to the driving element, a gear carried with the mutor, a second gear in mesh with the first and operatively connected with the part to be driven, a rotatable frame supporting the second gear and the mutor and permitting the first gear to roll upon the periphery of the second gear in response to variations in torque reactance, and manually controlled means to vary the position of the supporting frame.

8. A power transmission device comprising a spherical driving element, a mutor having gripping elements for co-operation with the spherical driving element and capable of being changed in relative angular position with respect to the driving element, a gear carried with the mutor, a second gear in mesh with the first and operatively connected with the part to be driven, a rotatable frame supporting the second gear and the mutor and permitting the first gear to roll upon the periphery of the second gear in response to variations in torque reactance, a shaft geared to said frame, and means to rotate said shaft.

9. A power transmission device comprising a spherical driving element, a mutor having gripping elements for co-operation with the spherical driving element and capable of being changed in relative angular position with respect to the driving element, a gear carried with the mutor, a second gear in mesh with the first and operatively connected with the part to be driven, a rotatable frame supporting the second gear and the mutor and permitting the first gear to roll upon the periphery of the second gear in response to variations in torque reactance, a shaft geared to said frame, and a spring applied to said shaft to rotate the same in opposition to the torque reactance.

10. A power transmission device comprising a driving element, a driven element, one of said elements being capable of being changed in position with respect to the other element to vary the speed ratio of the two elements, a joint comprising one member carried with the element capable of being changed in position and a second member in operative relation with the first and operatively connected with the part to be driven, a rotatable frame supporting the element capable of being changed in position and the first mentioned member and permitting the first mentioned member to revolve about the axis of the second mentioned member in response to variations in torque reactance, and means to vary the position of the supporting frame.

11. A power transmission device comprising a driving element, a driven element, one of said elements being capable of being changed in position with respect to the other element to vary the speed ratio of the two elements, a joint comprising one member carried with the element capable of being changed in position and a second member in operative relation with the first and operatively connected with the part to be driven, a rotatable frame supporting the element capable of being changed in position and the first mentioned member and permitting the first mentioned member to revolve about the axis of the second mentioned member in response to variations in torque reactance, and means to oppose the rotation of the supporting frame.

12. A power transmission device comprising a driving element, a driven element, one of said elements being capable of being changed in position with respect to the other element to vary the speed ratio of the two elements, a joint comprising one member carried with the element capable of being changed in position and a second member in operative relation with the first and operatively connected with the part to be driven, a rotatable frame supporting the element capable of being changed in position and the first mentioned member and permitting the first mentioned member to revolve about the axis of the second mentioned member in response to variations in torque reactance, and a spring applied to the frame to oppose rotation thereof.

This specification signed the 24 day of August A. D. 1922.

CARL W. WEISS.